(12) United States Patent
Granier

(10) Patent No.: US 6,726,747 B2
(45) Date of Patent: Apr. 27, 2004

(54) METHODS AND APPARATUSES FOR TREATMENT OF SYNGAS AND RELATED GASES

(75) Inventor: Francois Granier, Houston, TX (US)

(73) Assignee: American Air Liquide, Fremont, CA (US)

(*) Notice: Subject to any disclaimer, the term of this patent is extended or adjusted under 35 U.S.C. 154(b) by 63 days.

(21) Appl. No.: 10/035,709

(22) Filed: Dec. 26, 2001

(65) Prior Publication Data
US 2002/0134243 A1 Sep. 26, 2002

Related U.S. Application Data
(60) Provisional application No. 60/277,596, filed on Mar. 21, 2001, and provisional application No. 60/282,627, filed on Apr. 9, 2001.

(51) Int. Cl.[7] .............................................. B01D 53/14
(52) U.S. Cl. ........................... 95/174; 95/177; 95/228; 95/230; 96/242; 423/246
(58) Field of Search ................................ 423/246, 248; 62/625, 632, 636, 617; 95/230, 228, 174, 173, 177, 178, 179; 96/242, 234

(56) References Cited

U.S. PATENT DOCUMENTS

| | | | |
|---|---|---|---|
| 4,102,659 A | * | 7/1978 | Martin |
| 4,311,496 A | * | 1/1982 | Fabian |
| 4,338,107 A | * | 7/1982 | Swallow |
| 4,596,588 A | * | 6/1986 | Cook |
| 4,805,414 A | * | 2/1989 | Fisher |
| 4,888,035 A | * | 12/1989 | Bauer |
| 5,133,793 A | * | 7/1992 | Billy |
| 5,295,356 A | * | 3/1994 | Billy |
| 5,351,491 A | * | 10/1994 | Fabian |
| 5,509,271 A | * | 4/1996 | Billy et al. |
| 5,592,831 A | * | 1/1997 | Bauer et al. |
| 5,609,040 A | * | 3/1997 | Billy et al. |
| 6,062,042 A | * | 5/2000 | McNeil et al. |
| 6,073,461 A | * | 6/2000 | McNeil et al. |
| 6,082,134 A | * | 7/2000 | McNeil et al. |
| 6,094,938 A | * | 8/2000 | McNeil et al. |
| 2002/0134243 A1 | * | 9/2002 | Granier |

FOREIGN PATENT DOCUMENTS

| EP | 0 895 961 B1 | 5/2000 |
| EP | 1 074 510 A2 | 2/2001 |
| GB | 1 579 553 | 11/1980 |

* cited by examiner

Primary Examiner—Duane S. Smith
(74) Attorney, Agent, or Firm—Linda K. Russell

(57) ABSTRACT

An improved methane wash cycle is disclosed wherein a reduced amount of methane wash is required, thereby allowing for savings in energy costs in operation of the cycle and capital costs in constructing the cycle. Further embodiments allow for an energy recovery and an enhanced recovery of a carbon monoxide and/or hydrogen product.

19 Claims, 5 Drawing Sheets

METHODS AND APPARATUSES FOR TREATMENT OF SYNGAS AND RELATED GASES

RELATED APPLICATIONS

The present application is related to provisional patent Ser. No. 60/277,596 with a filing date of Mar. 21, 2001 and provisional patent Ser. No. 60/282,627 with a filing date of Apr. 9, 2001.

TECHNICAL FIELD

The present invention relates to methods and apparatuses for treating syngas.

BACKGROUND ART

For purposes of this patent, the following terms are defined. As used herein, the term "air separating unit" or "air separation unit" means and refers to a facility, plant, location or process for separating the components of a feed gas and may include both cryogenic and non-cryogenic facilities. The term "contaminant" means and refers to components of a gas that are undesired in the final product. The terms "remove" and/or "withdraw" means and refers to removing, withdrawing, extracting, and/or the like.

The term "feed gas" means and refers to a gas fed to a process or distillation apparatus. The term "cold box process" means and refers to processes to purify carbon monoxide ("CO") and/or hydrogen ("H2"). The term "methane wash" means and refers to a type of cold box process. The term "syngas" means and refers to synthetic and/or synthesis gas containing at least H2 and CO. Syngas is commonly produced by catalytic conversion or partial oxidation of a hydrocarbon.

The use of a particular structure, structures, or embodiments in this disclosure is not meant to be limiting. For instance, the term apparatus or apparatuses means and includes production facilities, plants, and/or the like. Further, the term process or processes means and includes methods, plans, production plans, and/or the like. The term led out means and refers to allowing out, passing out, discharging, releasing, and/or the like. The term fed or feed means and refers to directing, introducing, adding, channeling or sending a substance and/or substances to a process and/or apparatus. The term substance means and refers to and includes a liquid, a gas and/or a solid.

There are various prior art patents and/or patent applications that disclose producing CO from syngas, including, but not limited to, U.S. Pat. No. 5,133,793, GB-A-1579553, U.S. Pat. No. 5,295,356 and U.S. Pat. No. 5,592,831. The disclosures of which are incorporated herein by reference.

The '793 patent discloses the separation of a synthesis gas or other gaseous mixture of hydrogen and carbon monoxide by a process in which feed gas condensate is separated from the feed prior to the methane wash column. Only the vapor portion of the separation is fed to the wash column. The condensate is vaporized and fed to the stripping column at a location below that of the sump liquid from the wash column. The hydrogen stripped CO loaded methane liquid is subcooled and split into three substreams. One substream is introduced, at its bulb temperature, at the upper location of the separation column. Another substream is vaporized and introduced, at about it dew point, at a lower location of the separation column. The third substream is vaporized and introduced, at an intermediate temperature of the other streams, at an intermediate location to the other streams.

The '553 patent discloses a process in which CO loaded methane is countercurrently contacted with hydrogen rich vapor.

The '356 patent discloses a separation process whereby the columns are cooled with a closed loop refrigeration cycle of nitrogen.

The '831 patent discloses a process in which the methane wash is conducted with methane containing at least 2 to 15 mol % CO. The methane scrubbing column and the flash column are combined into a single column and the hydrogen stripped CO loaded methane is fed to the CO/methane separation column as a subcooled liquid with the remainder after vaporization.

Generally, cold box efficiencies are measured by several factors. In a classical cold box utilizing a methane wash, the performance of a methane wash cold box is most often measured by, but not limited to:

CO recovery (this parameter has a direct impact on the quantity of feedstock required to generate the syngas)

Power consumption required to produce refrigeration and separation/purification of the products usually through a CO (or N2) refrigeration cycle including a compressor and a cryogenic expander.

Often, a desired end product H2/CO ratio does not match the H2/CO ratio of the syngas feed gas. Quite commonly, an excess of H2 is produced. This excess H2 is then required to be disposed of through burning, such as a fuel in reformer and/or the like or disposed of elsewhere. The prior art has arrived at various solutions to this problem.

For example, one prior art solution is to use a membrane-based permeation unit. Commonly, membrane-based permeation units are installed upstream of the cold box in a methane wash treatment. H2 is extracted from the syngas and produced impure and at low pressure from the membrane. The cold box then treats the required quantity of H2. However, such methods are limited by equipment sizing and power consumption. Prior art solutions related to this method are economical only when the excess of H2 is large enough so that the savings on cold box can justify the additional cost of the membrane and retrofitting of the facility. As well, prior art solutions of this type remove an H2 stream that contains a CO concentration of about 1–2%, thereby decreasing the CO production.

Another prior art solution is to treat all the syngas in a cold box. The entire H2 flow is washed in the methane wash column so that most of the CO is extracted from the H2. The H2 is extracted and a first portion of the H2 product is produced under pressure and a second portion is expanded in a cryogenic expander to produce refrigeration. However, prior art methods of this type do not produce adequate refrigeration when the volume of the second portion is relatively small, consequently increasing power consumption is required when there are only small amounts of H2 in the syngas.

Other prior art examples of improving CO recovery are illustrated in U.S. Pat. No. 4,888,035 to Bauer and European Patent No. EP 0 895 961 to McNeil. These patents illustrate processes for increasing CO recovery from a stripper column by an additional injection of CH4 as a wash liquid in the stripper column. The '035 patent teaches and discloses the use of a regenerated CH4 stream that is removed from a flash column and injected into the stripper column above the feed from the wash column to increase CO recovery from the syngas. However, these patents do not teach or suggest the use of an intermediate withdraw of a portion of the H2 from a point intermediate on a methane wash column to reduce an amount of liquid methane required to wash a hydrogen product. As well, the '035 patent does not teach or suggest procedures and or structures for the reduction of power consumption and capital expenditure reduction. Moreover, the '035 patent does not appreciate that increasing the amount of methane wash requires decreasing the operating pressure of the flash column, thereby not producing CO at a maximum rate.

The '961 patent discloses the use of a feed of a H2/Ch4 liquid from the wash column to wash the CO in the stripper column. The '961 patent is directed at CO loss and power conservation by removing an intermediate stream from the bottom stage of the methane wash column to provide impure methane reflux to the top of the hydrogen stripping column. The '961 patent states that it is an improvement over the '035 patent because the '961 patent discloses using an impure methane reflux from the wash column that is rich in CO, thereby allowing for savings in methane. The '961 patent recognizes that the procedure requires a greater amount of methane for washing the CO, but the amount of methane used would be less than the amount required for the '035 patent which would result in power savings of between 2 to 4 percent as compared to equivalent CO content in the reject hydrogen stream of the '035 patent. However, the '961 patent still requires extra capital expenditure for a large pump and costs associated with the operation of the pump. Accordingly, the art field is in search of a method of enhancing CO recovery from syngas without excessively increasing energy consumption and/or costs. A related patent to the '961 patent issued in the United States as U.S. Pat. No. 6,082,134 on Jul. 4, 2000.

Another prior art solution for enhancing CO recovery from syngas is disclosed in European Patent Application 1074510 A2 to Air Products and Chemicals (inventor is McNeil). The patent application discloses a process and system whereby hydrogen and carbon monoxide are separated from a condensate-containing gaseous mixture by using a first stripping column to lower the hydrogen content of the CO loaded methane stream obtained by washing CO from the gaseous mixture ascending a methane wash column and a second stripping column to lower the hydrogen content of the feed gas condensate obtained from the methane wash column or phase separation. The vapor stream from the second stripping column or flash separator is fed to the first stripping column. The liquid stream from the first and second stripping columns are fed to different locations on a gaseous carbon monoxide separation column whereby a gaseous CO product stream is removed and a methane wash recycle stream is removed. The process is stated as improving the efficiency of the separation of the CO by avoiding the dilution of the CO with the CO loaded methane stream. However, the patent still requires large pumps for pumping the methane, thereby increasing capital expenditures and energy consumption. Accordingly, the art field is in search of a method whereby capital expenditures may be reduced and energy consumption may be reduced while still obtaining high CO recovery. As well, the art field is in search of a method whereby CO flow rates may be increased while producing high purity CO.

SUMMARY OF THE INVENTION

The present invention generally relates to methods and apparatuses for the treatment of syngas for the production of carbon monoxide, H2 and/or related gases. Generally, CO stream production from a syngas treatment facility may be enhanced by withdrawing at least one H2 rich stream from an intermediate point or points on a wash column associated with the syngas treatment facility.

This summary is not intended to be a limitation with respect to the features of the invention as claimed and any examples are merely intended as embodiments, and the scope and other objects can be more readily observed and understood in the detailed description of the preferred embodiment and the claims.

BRIEF DESCRIPTION OF DRAWINGS

For a further understanding of the nature and objects of the present invention, reference should be made to the following detailed description, taken in conjunction with the accompanying drawings, in which like elements are given the same or analogous reference numbers and wherein.

GENERAL DESCRIPTION AND A MODE FOR CARRYING OUT THE INVENTION

For purposes of the description of this invention, the terms "upper", "lower", "right", "left", "vertical", "horizontal", "top", "bottom", and other related terms shall be defined as to relation of embodiments of the present invention as it is shown an illustrated in the accompanying Figures. However, it is to be understood that the invention may assume various alternative structures and processes and still be within the scope and meaning of this disclosure. Further, it is to be understood that any specific dimensions and/or physical characteristics related to the embodiments disclosed herein are capable of modification and alteration while still remaining within the scope of the present invention and are, therefore, not intended to be limiting.

Figure 1:
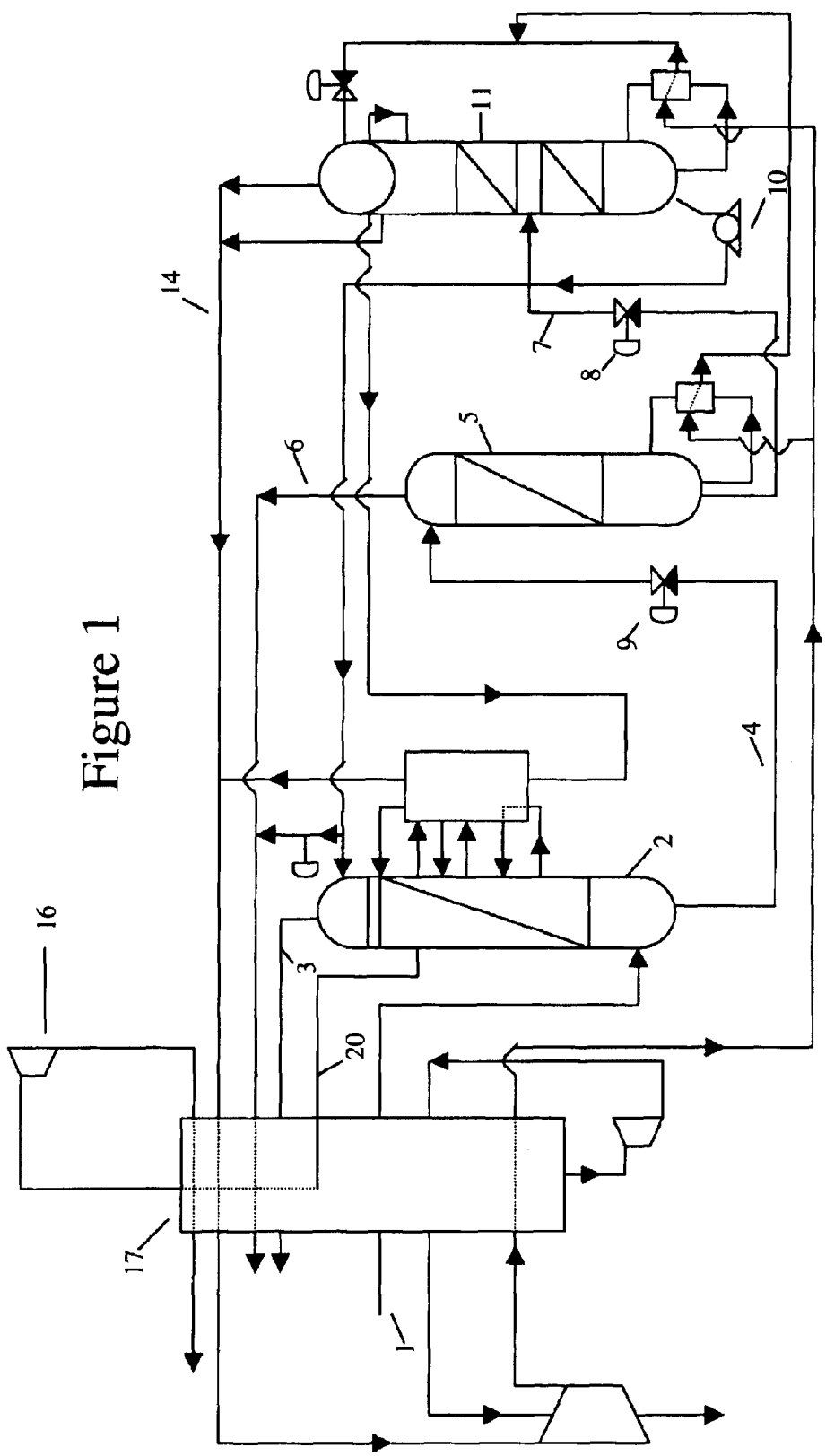
FIG. 1 is an illustration of an embodiment of an apparatus of the present invention.

Referring now to FIG. 1, an illustration of an embodiment of an apparatus of the present invention, a common cold box process using a methane wash is disclosed. The process provides for production of a carbon monoxide rich gas and/or production of a hydrogen rich gas. An embodiment of a cold box process of the present invention utilizes a methane wash column 2, a flash column 5 and a distillation column 11, sometimes referred to as a stripper or stripping column 11. Various embodiments of the present invention incorporate multiple wash columns, flash columns, and/or multiple distillation columns. The multiple columns may be connected in series, parallel, alternating and/or any other method common in the art.

A feed gas stream to embodiments of the present invention generally comprises a stream containing at least carbon monoxide and hydrogen, such as syngas. The feed gas is cooled, dried and carbon dioxide ("CO2") is withdrawn by any method common in the art, such as passing feed gas 1 through heat exchanger 17 after carbon dioxide removal and drying. Feed gas stream 1 is then passed into a methane wash column 2 by a conduit means that may be a pipe, channel, path, and/or any other method and/or structure common in the art. In an embodiment, feed gas stream 1 is passed into a lower portion of methane wash column 2. A portion of feed gas stream 1 rising in column 2 is brought into gas-liquid contact in a countercurrent state with reflux methane ("CH4") rich liquid flowing down from above. As a result, the downward liquid flow is gradually enriched in components whose boiling points are higher than that of hydrogen to become a carbon monoxide rich liquid. In the same manner, upward rising vapor is gradually enriched in hydrogen to become a hydrogen rich gas. A first hydrogen rich stream 3 is extracted from an upper portion of column 2 by a conduit means that may be a pipe, channel, path, vent, and/or any other method and/or structure common in the art. First hydrogen stream 3 may be extracted as a product, warmed through heat exchanger 17 before extraction as a product, used further in the process(es), expanded and used to recover energy and/or for any other purpose common in the art.

At least one second hydrogen rich stream 20 is extracted from at least one upper intermediate portion of column 2 by a conduit means that may be a pipe, channel, path, and/or any other method and/or structure common in the art. Extracting at least one second hydrogen rich stream reduces the amount of methane required in the wash column. As well, an intermediate extraction will increase carbon monoxide recovery by decreasing the amount of methane required for washing of feed gas stream 1 which consequently allows for a higher pressure in flash column 5. Further, reduction in the amount of methane required for washing allows for smaller sized of columns for a given volume of feed gas, thereby saving in capital expenditures and power consumption by the process. In various embodiments, experimental results have illustrated a total power consumption reduction by about 10% to about 40%. However, other power savings may be realized. Second hydrogen stream 20 may be extracted as a product, warmed through heat exchanger 17 before extraction as a product, mixed with liquid methane to lower methane vaporization temperature, used further in the process, and/or for any other purpose common in the art. In other embodiments, a portion of second hydrogen stream 20 may be expanded in expander 16 to provide refrigeration. Expanded stream 20 may then be collected as an expanded hydrogen stream. In various embodiments, expansion of stream 20 can be used to replace and/or supplement a carbon monoxide/nitrogen expansion, thereby conserving a greater portion of the carbon monoxide for collection as a product. Other embodiments utilize other hydrogen stream withdraws such that a multiple number of withdraws may be performed. Moreover, the withdraw and/or withdraws aren't necessarily limited to an upper portion of column and ay be performed elsewhere on column 2.

Various embodiments of the present invention may be used to remove varying percentages and/or contents of the total hydrogen in the syngas through the stream 20. In an embodiment, 15% to 50% of the total hydrogen in the syngas is removed through stream 20. In an alternate embodiment, about 26% of the total hydrogen in the syngas is removed through stream 20.

A second carbon monoxide rich stream 4, also usually containing methane, is withdrawn from a lower portion of column 2 by a conduit means that may be a pipe, channel, path, and/or any other method and/or structure common in the art. In various embodiments, stream 4 is at least partially liquid. Stream 4 may be flashed across a valve 9 before introduction to a flash column 5. In flash column 5, a portion of the remaining hydrogen in stream 4 is withdrawn as a third hydrogen rich stream 6 by a conduit means that may be a pipe, channel, path, and/or any other method and/or structure common in the art. Stream 6 may be collected as a product or used for any other purpose, as herein stated.

A portion of liquid in flash column 5 is withdrawn as stream 7 and introduced to a distillation column 11 by a conduit means that may be a pipe, channel, path, and/or any other method and/or structure common in the art. In various embodiments, stream 7 is flashed across a valve 8 before being fed to column 11. A third carbon monoxide stream 14 is extracted from an upper portion of column 11 by a conduit means that may be a pipe, channel, path, and/or any other method and/or structure common in the art and methane, typically at least partially liquid methane, is withdrawn from a lower portion of column 11 by a conduit means that may be a pipe, channel, path, and/or any other method and/or structure common in the art and recycled back to column 2, such as through pump 10. In various embodiments of the present invention, the volume of carbon monoxide extracted in the third carbon monoxide stream is about 92% to about 99% by volume of the carbon monoxide in the feed gas.

Figure 2:
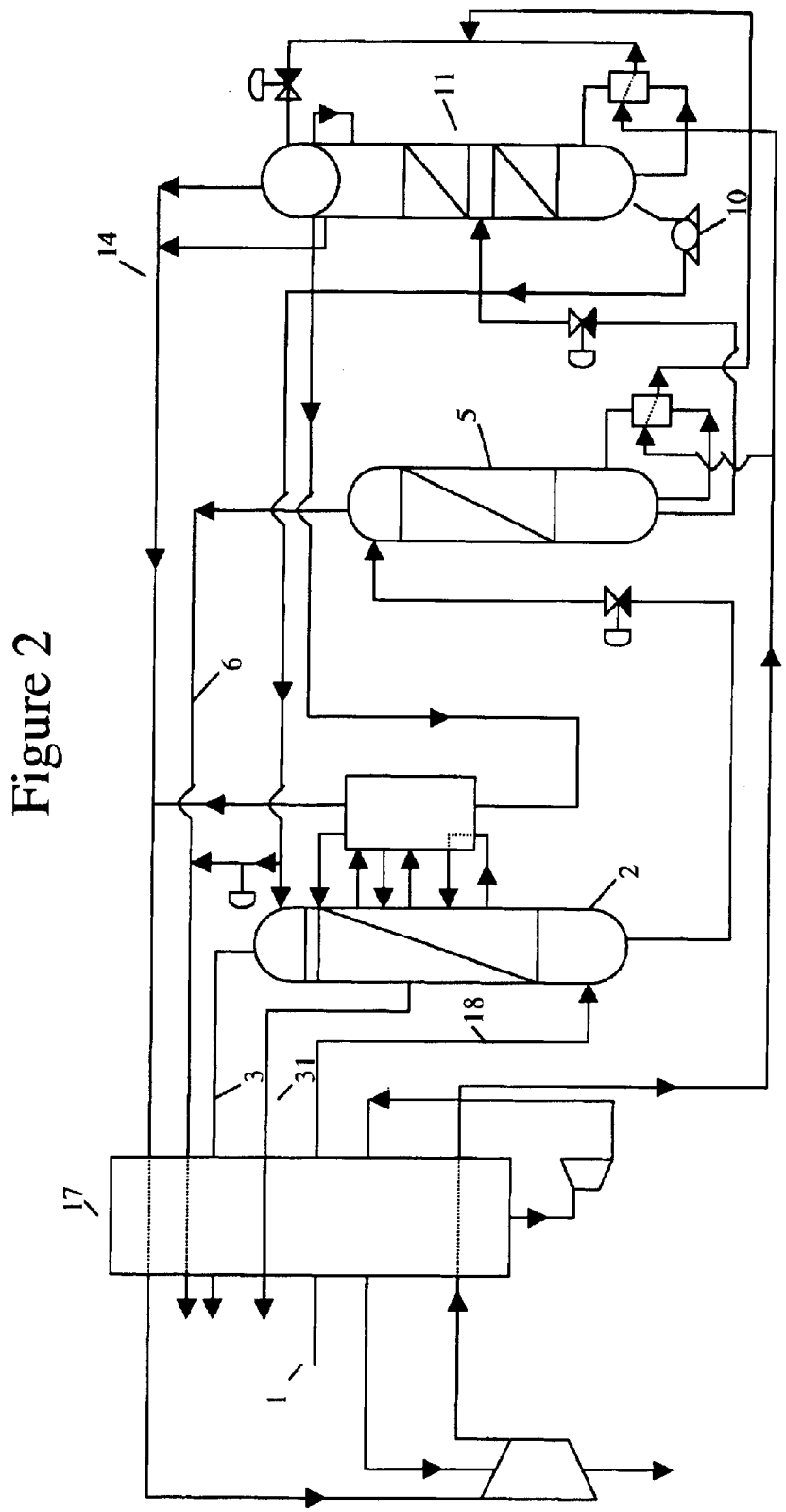
FIG. 2 is an illustration of an alternate embodiment of an apparatus of the present invention.

Now referring to FIG. 2, an illustration of an alternate embodiment of a process and apparatus of the present invention, at least one intermediate hydrogen rich stream 31 is extracted from at least one intermediate portion of column 2 and collected as a product. The product collected may be warmed in a heat exchanger or collected from the column, as before mentioned.

Generally, a feed gas 18 is fed to wash column 2 wherein separation occurs through rectification as heretofore described wherein at least one first hydrogen rich stream 3 may be withdrawn and at least one second hydrogen stream 31 may be withdrawn. First stream 3 is usually withdrawn at an area about an upper portion of column 2 and second stream 31 is withdrawn about an area intermediate feed 18 and first stream 3.

Figure 3:
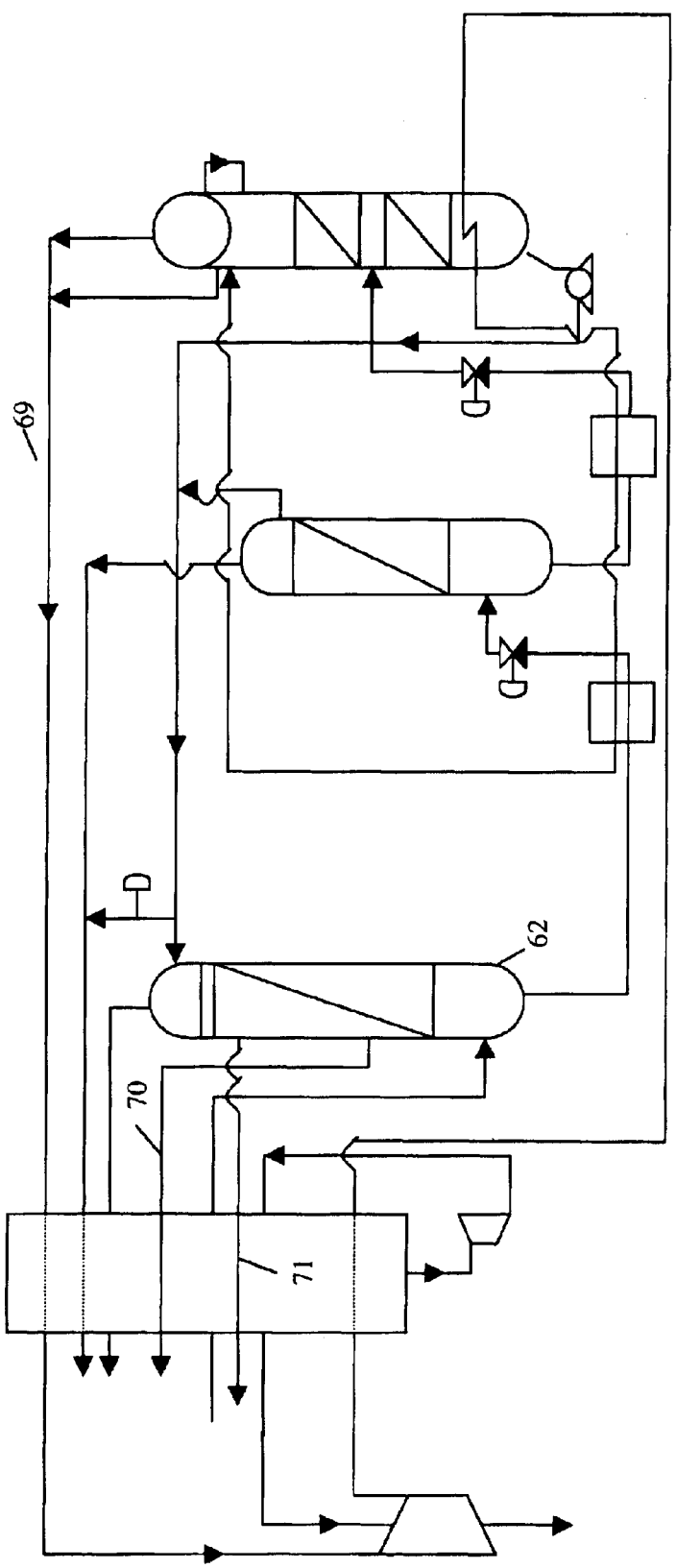
FIG. 3 is an illustration of an alternate embodiment of an apparatus of the present invention.

Now referring to FIG. 3, an illustration of an alternate embodiment of a process and apparatus of the present invention, an intermediate hydrogen rich stream 70 is extracted from at least one lower intermediate portion of column 62 and collected as a product and an intermediate hydrogen rich stream 71 is extracted from at least one other intermediate portion of column 62. However, various other embodiments utilize varying numbers of withdraws intermediate of feed and first hydrogen product withdraw.

Figure 4:
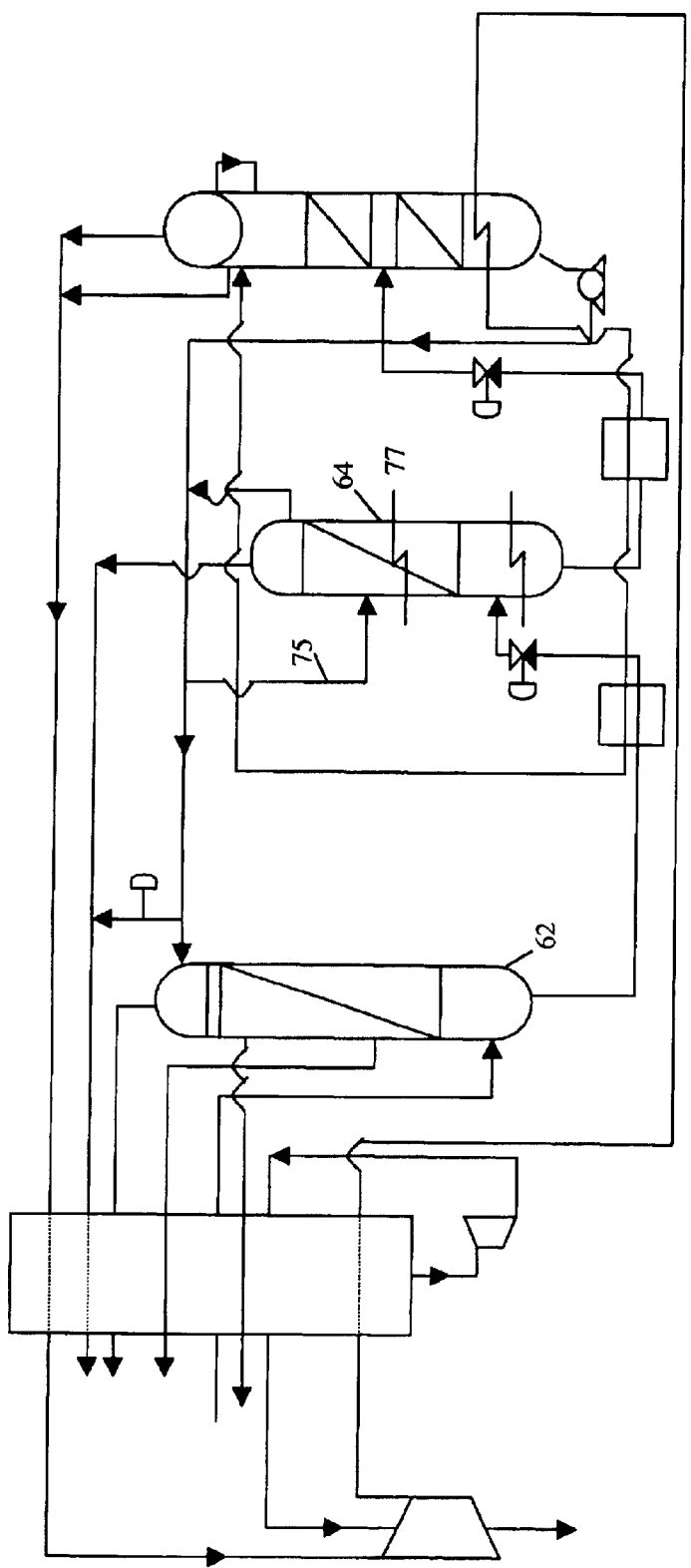
FIG. 4 is an illustration of an alternate embodiment of an apparatus of the present invention.

Now referring to FIG. 4, an illustration of an alternate embodiment of an apparatus of the present invention, enhanced carbon monoxide recovery and hydrogen striping can be realized by injecting a regenerated methane stream 75 to further scrub out carbon monoxide that has remained in the hydrogen released during stripping in flash column 64. Regenerated methane may be injected at any location of flash column 64 above the feed from wash column 62. In various embodiments, a cooling trap 77 is below a feed point for the regenerated methane. However, such other and further embodiments may utilize differing arrangements and/or sources of methane for aid in further removal of hydrogen in flash column 64.

Figure 5:
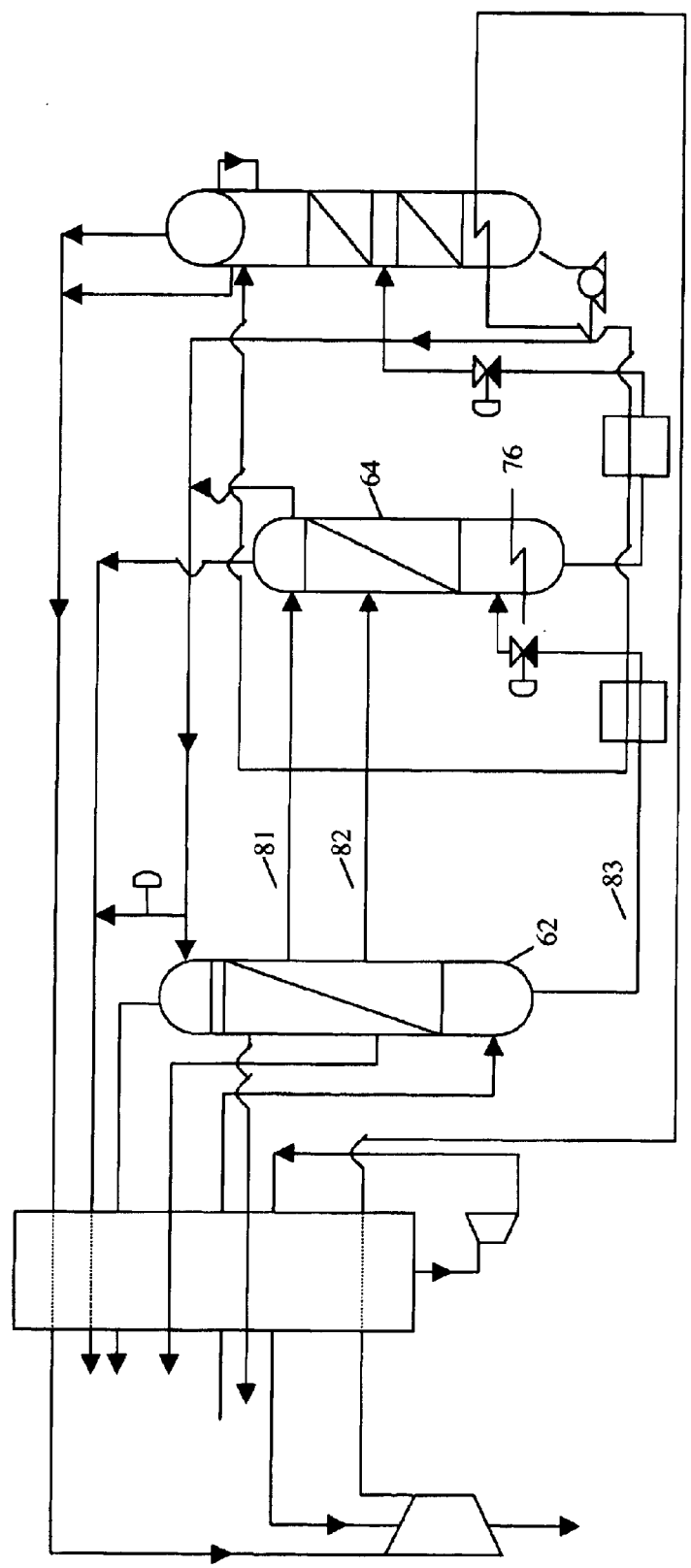
FIG. 5 is an illustration of an alternate embodiment of an apparatus of the present invention.

Now referring to FIG. 5, an illustration of an alternate embodiment of an apparatus of the present invention, an alternate manner of increasing carbon monoxide production is illustrated. Stream 82, in various embodiments, a liquid, is withdrawn from column 62 from a lower portion and fed to flash column 64. In various embodiments, the mixture withdrawn may be reduced in pressure as needed and as is common in the art. A condensed crude stream 83, typically at least partially a liquid, is withdrawn from column 62 and fed to column 64. In various embodiments, stream 83 may be at least partially vaporized in a heat exchanger. In various embodiments, a reboiler 76 is used to provide a vapor to aid in stripping of hydrogen and carbon monoxide in column 64. Additionally, in various embodiments, a methane rich stream 81 for scrubbing may be withdrawn from column 62 and fed to an upper portion of column 64 to provide a wash liquid to the upper portion of column 64 to further aid in reduction of carbon monoxide losses in hydrogen withdrawn from column 64. Removal of a methane stream from column 62 allows for a greater reflux in the flash column and or distillation column to further aid in carbon monoxide recovery.

Other embodiments may withdraw a single stream from a wash column and then split the stream withdrawn before injection of the withdrawn stream into another column. For example, in an embodiment a stream is withdrawn from the wash column and split into a first and a second substream. The first substream is subcooled and injected into the flash column and the second substream is vaporized and injected into the flash column at a location below the injection of the first substream. Other embodiments withdraw a stream from the flash column and split the stream into a first and second substream. In this embodiment, the first substream is subcooled and injected into the distillation column and the second substream is vaporized and injected into the distillation column at a location below the injection of the first substream.

The present invention is also directed to methods and processes for enhancing production of hydrogen and carbon monoxide, as from syngas. Generally, the method comprises the steps of passing a feed gas, such as syngas, to a cold box system comprising a wash column, a flash column, and a distillation column; and, withdrawing at least one second hydrogen rich stream from an intermediate portion of the wash column. Additional embodiments of methods of the present invention may further comprise expanding a potion of the withdrawn second hydrogen rich stream for providing refrigeration for the process, another process or for other energy recovery. Other embodiments may include other uses for the withdrawn second hydrogen rich stream and/or other processes within the cold box system. Further, other embodiments utilize at least one methane rich vapor and/or liquid withdraw from awash column to provide reflux and/or aid in stripping hydrogen in a flash column.

In a further embodiment, the present invention is a process for improving the separation of a feed gas comprised of at least carbon monoxide and hydrogen wherein the mixture is washed with liquid methane to separate, at least partially, a first carbon monoxide rich stream and a first hydrogen rich stream, the first carbon monoxide rich stream is separated into at least a second carbon monoxide rich stream, the second carbon monoxide rich stream is further separated into a third carbon monoxide rich product stream wherein the improvement comprises the step of:

withdrawing at least one second hydrogen rich stream from the wash column at a location intermediate of the first hydrogen stream and the carbon monoxide stream.

EXAMPLE

A classical methane wash cold box was established utilizing 27 bar absolute pressure resulting in an H2 recovery of 5444 Nm3/h from feed syngas with a 5540 Nm3/h quantity of H2. The CH4 wash required was 3400 Nm3/h to achieve less than 5 ppm CO in the purified H2. Cycle power consumption was at 640 kW.

Utilizing these same conditions, an intermediate extraction of H2-enriched gas at 1450 Nm3/h of H2 allowed for an H2 product of 4039 Nm3/h with less than 5 ppm CO to be extracted. The intermediate H2 extraction reduced the amount of methane required to wash the syngas in the wash column. As a consequence the feed to the flash column and to the CO/CH4 distillation column is reduced leading to both power consumption savings and investment savings. The methane wash recycle was reduced to 1900 Nm3/h, power consumption was reduced to 490 kW. The flash column pressure was increased from 8 to 9.7 bars thus increasing CO recovery from 95.39% to 95.86%.

The quantity of CO lost in the intermediate withdrawal is inconsequential when compared to the improvement of CO recovery on the flash column. Decreasing the CH4 wash recycle allows a lower portion of the flash column to be richer in CO. Therefore, it can be operated at a higher pressure for a given CO recycle pressure, thus allowing a lower CO loss at the top of the flash column and increasing CO recovery.

Decreasing the CH4 wash flow also increases the H2 recovery, i.e. an extraction of 1450 Nm3/h from the intermediate portion still allowed recovery of 4039 Nm3/h at an upper potion because less CH4 wash means less H2 loss in the CH4.

Furthermore, an expansion of the withdrawn H2 from the intermediate portion produced an additional saving of 140 kW/h by replacing a traditional CO/N2 expansion.

As to the manner of operation and use of the present invention, the same is made apparent from the foregoing discussion. With respect to the above description, it is to be realized that although dimensional embodiments of specific material is disclosed, those enabling embodiments are illustrative, and the optimum dimension relationships for the parts of the invention are to include variations in composition, form, function and manner of operation, assembly and use, which are deemed readily apparent to one skilled in the art in view of this disclosure, and all equivalent relationships to those illustrated in the drawings and encompassed in the specifications are intended to be encompassed by the present invention.

Therefore, the foregoing is considered as illustrative of the principles of the invention and since numerous modifications will readily occur to those skilled in the art, it is not desired to limit the invention to the exact construction and operation shown or described, and all suitable modifications and equivalents may be resorted to, falling within the scope of the invention.

While the foregoing is directed to various embodiments of the present invention, other and further embodiments of the invention may be devised without departing from the basic scope thereof, and the scope thereof is determined by the example and claims which follow.

What is claimed is:

1. A process for improving the separation of a feed gas comprised of at least carbon monoxide and hydrogen wherein the mixture is washed with liquid methane to separate, at least partially, a first carbon monoxide rich stream and a first hydrogen rich stream in a wash column, the first carbon monoxide rich stream is further separated into a second carbon monoxide rich stream, and the second carbon monoxide rich stream is stripped into a third carbon monoxide rich stream wherein the improvement comprises the step of:

withdrawing at least one second hydrogen rich stream from the wash column at a location intermediate of the first hydrogen stream and the first carbon monoxide stream.

2. The process of claim 1 further comprising the step of withdrawing at least one methane rich stream from the wash column at a location intermediate of the hydrogen stream and the carbon monoxide stream.

3. The process of claim 2 wherein at least a portion of the methane rich stream is fed to a flash column associated with the process.

4. The process of claim 1 wherein the feed gas consists primarily of carbon monoxide and hydrogen.

5. The process of claim 1 wherein the at least one second hydrogen rich stream is expanded to recover energy.

6. The process of claim 1 wherein the at least one hydrogen rich stream is expanded to provide refrigeration.

7. The process of claim 1 wherein the first carbon monoxide stream is split into a first and a second substream.

8. The process of claim 7 wherein the first substream is subcooled and injected into another column.

9. The process of claim 7 wherein the second substream is vaporized and injected into another column.

10. The apparatus of claim 1 wherein the second hydrogen rich stream is about 15% to 50% of the total hydrogen flow contained in the syngas.

11. The apparatus of claim 1 wherein a first hydrogen rich stream is withdrawn about an upper portion of the wash column.

12. The apparatus of claim 11 wherein the first hydrogen rich stream is withdrawn with a carbon monoxide content of less than 1 ppm.

13. The apparatus of claim 1 wherein a third carbon monoxide rich stream is about 92 percent to about 99 percent by volume of the carbon monoxide in the feed gas.

14. An apparatus for the separation of carbon monoxide gas and hydrogen from a gaseous mixture comprising:
   a methane wash column;
   a hydrogen flash column;
   a carbon monoxide/methane distillation column;
   at least one conduit means for feeding a feed gas comprising at least carbon monoxide and hydrogen to the wash column;
   at least one conduit means for feeding a first carbon monoxide rich stream from the wash column to the at least one location about the flash column;
   at least one conduit means for feeding a second carbon monoxide rich stream from the flash column to the stripping column; and,
   at least one conduit means provided intermediate on the wash column for withdrawing a second hydrogen stream.

15. The apparatus of claim 14 further comprising at least one second conduit means for withdrawing at least one methane enriched stream from the wash column and injecting the at least one methane enriched stream into the flash column.

16. The apparatus of claim 14 wherein the at least one conduit means for feeding a second carbon monoxide rich stream from the flash column to at least one location about the distillation column comprises a first and a second conduit means whereby the second stream is divided into a first substream and a second substream.

17. The apparatus of claim 16 wherein the first substream is injected at a location about the distillation column and the second substream is injected at a location on the distillation column below the first substream.

18. The apparatus of claim 14 further comprising an expander connected to the conduit means for extracting the second hydrogen product.

19. A process for separating a carbon monoxide stream from a feed gas comprising at least carbon monoxide and hydrogen comprising the steps of:
   separating a third carbon monoxide rich stream from the feed gas in a system comprising a wash column, a flash column, and a stripping column wherein the feed gas is separated into a first carbon monoxide rich stream, a first hydrogen rich stream, and a second hydrogen rich stream in the wash column, the first carbon monoxide rich stream is further separated into a second carbon monoxide rich stream in the flash column, the second carbon monoxide rich stream is further separated into a third carbon monoxide rich stream in the stripper column whereby the volume of the carbon monoxide in the third carbon monoxide rich stream is about 92% to about 99% of the volume of the carbon monoxide in the feed gas and the extraction of the second hydrogen rich stream reduces an amount of methane required to wash the feed gas.

* * * * *